United States Patent
Yamanashi et al.

(10) Patent No.: US 8,537,458 B2
(45) Date of Patent: Sep. 17, 2013

(54) OPTICAL FIBER FOR OPTICAL AMPLIFICATION, OPTICAL FIBER AMPLIFIER, AND OPTICAL FIBER LASER

(75) Inventors: Youko Yamanashi, Tokyo (JP); Shigeto Matsumoto, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 579 days.

(21) Appl. No.: 12/829,730

(22) Filed: Jul. 2, 2010

(65) Prior Publication Data

US 2011/0007385 A1    Jan. 13, 2011

(30) Foreign Application Priority Data

Jul. 8, 2009 (JP) .................................. 2009-162233

(51) Int. Cl.
*H01S 3/02* (2006.01)

(52) U.S. Cl.
USPC ...................................................... 359/341.1

(58) Field of Classification Search
USPC .......................... 372/6; 359/341.1; 385/142
See application file for complete search history.

(56) References Cited

U.S. PATENT DOCUMENTS

| 5,027,079 A * | 6/1991 | Desurvire et al. ........ 359/341.32 |
| 6,903,866 B2 * | 6/2005 | Aiso ............................ 359/341.1 |
| 2006/0187540 A1 * | 8/2006 | Andrejco et al. ........... 359/341.5 |

FOREIGN PATENT DOCUMENTS

| JP | 2001-244535 A | 9/2001 |
| JP | 2001-274490 A | 10/2001 |
| JP | 2002-261366 A | 9/2002 |
| JP | 2003-318473 | 11/2003 |
| JP | 2006-199550 A | 8/2006 |
| JP | 2007-103641 A | 4/2007 |
| JP | 2008-172166 A | 7/2008 |

OTHER PUBLICATIONS

Japanese Office Action Issued Mar. 12, 2013 in Patent Application No. 2009-162233 (with English translation).

* cited by examiner

*Primary Examiner* — Mark Hellner
(74) *Attorney, Agent, or Firm* — Oblon, Spivak, McClelland, Maier & Neustadt, L.L.P.

(57) ABSTRACT

An optical fiber for optical amplification has: a core portion doped with at least erbium and aluminum; a cladding portion formed around the core portion and having a refractive index smaller than that of the core portion; a peak value of absorption coefficient of 35 dB/m or greater at a wavelength around 1530 nanometers; normal dispersion characteristics and an effective core area of 20 μm² or larger, at a wavelength of 1550 nanometers; and a power conversion efficiency of a conversion from pumping light to amplified light having a wavelength of 1550 nanometers is 30% or more.

8 Claims, 4 Drawing Sheets

FIG.5

| | COMPARATIVE EXAMPLE 1 | COMPARATIVE EXAMPLE 2 | EXAMPLE 1 | EXAMPLE 2 | EXAMPLE 3 | EXAMPLE 4 | UNIT |
|---|---|---|---|---|---|---|---|
| CORE DIAMETER | 3.8 | 3.7 | 3.5 | 3.2 | 3.4 | 3.4 | $\mu m$ |
| Δ | 0.7 | 0.8 | 1.1 | 1.0 | 1.3 | 1.1 | % |
| Aeff @ 1550 nm | 33.68 | 30.6 | 20.4 | 32.1 | 23.08 | 20.68 | $\mu m^2$ |
| CUTOFF WAVELENGTH | 934.7 | 995.5 | 1135.9 | 1064.8 | 1218.3 | 1214.3 | nm |
| Al CONCENTRATION | 2.9 | 0.78 | 1.5 | 3.8 | 2.6 | 1.5 | wt % |
| ABSORPTION COEFFICIENT @ AROUND 1530 nm | 92.9 | 19.8 | 54.6 | 70.7 | 64.0 | 51.4 | dB / m |
| Er CONCENTRATION | 2.0 | 0.32 | 0.78 | 1.5 | 1.0 | 0.752 | wt % |
| WAVELENGTH DISPERSION VALUE @ 1550 nm | -9.3 | -6.4 | -9.6 | -17.0 | -15.54 | -8.7 | ps / nm / km |
| CONVERSION EFFICIENCY | 8 | 59.3 | 50.1 | 32.1 | 41.3 | 50.0 | % |
| BIREFRINGENCE INDEX @ 1550 nm | — | — | — | | | $5.4 \times 10^{-4}$ | — |

OPTICAL FIBER FOR OPTICAL AMPLIFICATION, OPTICAL FIBER AMPLIFIER, AND OPTICAL FIBER LASER

CROSS-REFERENCE TO RELATED APPLICATIONS

This application is based upon and claims the benefit of priority from Japanese Patent Application No. 2009-162233, filed on Jul. 8, 2009, the entire contents of which are incorporated herein by reference.

BACKGROUND OF THE INVENTION

1. Field of the Invention

The present invention relates to an optical fiber for optical amplification, having a core portion doped with erbium as an optical amplification substance, and to an optical fiber amplifier and an optical-fiber laser.

2. Description of the Related Art

In recent years, optical fiber amplifiers using erbium doped optical fibers (EDF), which are optical fibers having core portions doped with erbium (Er) as an optical amplification substance, are used for various purposes.

The EDFs used in the optical fiber amplifiers are preferably those in which occurrence of nonlinear optical phenomena inside is suppressed so as to prevent degradation in the quality of amplified light. For example, Japanese Laid-Open Patent Publication No. 2003-318473 discloses an EDF having a refractive index profile adjusted to be of a so-called W-type or α-type. According to Japanese Laid-open Patent Publication No. 2003-318473, by making this adjustment to the refractive index profile, an absolute value of a wavelength dispersion of the EDF is increased and an overlap integral between an Er distribution in a core portion and a mode distribution of light propagated through the core portion is increased, thus increasing an absorption coefficient of the EDF and decreasing the length of the EDF to be used. Consequently, occurrence of nonlinear optical phenomena such as four-wave mixing and cross-phase modulation in the EDF is suppressed.

However, because optical fiber amplifiers have been used for more diverse purposes in recent years, intensities of light input to the EDFs tend to become higher. When light input to such an EDF has a high intensity, nonlinear optical phenomena tend occur in the EDF. Therefore, EDFs in which the occurrence of nonlinear optical phenomena is further suppressed have been demanded.

SUMMARY OF THE INVENTION

It is an object of the present invention to at least partially solve the problems in the conventional technology.

According to an aspect of the present invention, an optical fiber for optical amplification includes: a core portion doped with at least erbium and aluminum; and a cladding portion formed around the core portion and having a refractive index smaller than that of the core portion. The optical fiber also has: a peak value of absorption coefficient of 35 dB/m or greater at a wavelength around 1530 nanometers; normal dispersion characteristics and an effective core area of $20\ \mu m^2$ or larger, at a wavelength of 1550 nanometers; and a power conversion efficiency of a conversion from pumping light to amplified light having a wavelength of 1550 nanometers is 30% or more.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 depicts characteristics of EDFs according to Examples and Comparative Examples;

DETAILED DESCRIPTION OF THE PREFERRED EMBODIMENTS

Figure 1:
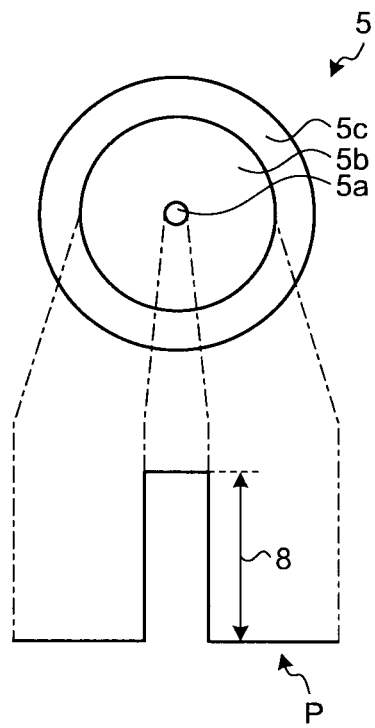
FIG. 1 depicts a schematic cross section of an EDF, which is an optical fiber for optical amplification according to a first embodiment of the present invention and a refractive index profile corresponding thereto.

Exemplary embodiments of an optical fiber for optical amplification, an optical fiber amplifier, and an optical fiber laser according to the present invention will be explained below in detail with reference to the accompanying drawings. The present invention is not limited to the embodiments. In the present specification, a cutoff wavelength is a fiber cutoff wavelength defined by the International Telecommunication Union Telecommunication Standardization Sector (ITU-T) G.650.1. Other terms not particularly defined in the specification follow the definitions and measurement methods in the ITU-T G.650.1. In the drawings, like or corresponding elements are denoted by like reference numerals.

FIG. 1 depicts a schematic cross section of an EDF, which is as an optical fiber for optical amplification according to a first embodiment of the present invention, and a refractive index profile corresponding thereto. As depicted in FIG. 1, an EDF 5 includes a core portion 5a, a cladding portion 5b formed around the core portion 5a, and a coating 5c made of a resin and formed around the cladding portion 5b.

The core portion 5a is made of silica doped with Er, aluminum (Al), germanium (Ge), and fluorine (F). The cladding portion 5b is made of silica having a lower refractive index than that of the core portion 5a. For example, the cladding portion 5b is made of pure silica not containing a dopant for adjusting a refractive index, such as Ge or F, or made of glass doped with F. The EDF 5 has a step-index type refractive index profile, as illustrated by a refractive index profile P. When a refractive index difference δ between a maximum value of refractive index of the core portion 5a and a refractive index of the cladding portion 5b is expressed as a relative refractive-index difference Δ, the relative refractive-index difference Δ is 1.1%. The relative refractive-index difference Δ is defined by the following equation (1), where "ncore"

represents a maximum refractive index of the core portion 5a, and "nclad" represents a refractive index of the cladding portion 5b.

$$\Delta = \{(n\text{core} - n\text{clad})/n\text{core}\} \times 100 (\%) \quad (1)$$

A diameter of the core portion 5a (core diameter) is 3.5 micrometers. The core diameter of the core portion 5a is defined as a diameter at a position having a relative refractive-index difference of one half of Δ in a boundary region between the core portion 5a and the cladding portion 5b.

A concentration of Er in the core portion 5a is very high at 0.78 wt %, and a concentration of Al is 1.5 wt %. Concentrations of Ge and F are appropriately adjusted such that the relative refractive-index difference Δ described above becomes 1.1%. By adding Ge, productivity of core soot used to manufacture the core portion 5a improves, and adjustment of a refractive index of the core portion 5a is facilitated.

Generally, the extent to which nonlinear optical phenomena occur in an optical fiber is larger when the intensity density of light in the core portion is higher, and also when the optical fiber and a light propagation distance are longer. The EDF 5 has the core diameter, the relative refractive-index difference Δ, and the Er concentration described above, and therefore, an effective core area of the EDF 5 becomes as large as 20.4 µm², and a peak value of an absorption coefficient at around a wavelength of 1530 nanometers of the EDF 5 is as very high as 54.6 dB/m, which is higher than 35 dB/m. Therefore, it is possible to make the length of the EDF 5 used to obtain a predetermined amplification gain short. Consequently, the intensity density of light in the core portion 5a of the EDF 5 becomes low, a light propagation distance becomes short, and thus occurrence of nonlinear optical phenomena in the EDF 5 is suppressed.

Furthermore, particularly, because the EDF 5 has the core diameter and the relative refractive-index difference Δ described above, the EDF 5 has a wavelength dispersion value of −9.6 ps/nm/km at a wavelength of 1550 nanometers, and normal dispersion characteristics (negative wavelength dispersion). Because the EDF 5 has the normal dispersion characteristics, when an optical fiber amplifier or an optical amplification device such as an optical-fiber laser is configured using the EDF 5, dispersion in a standard single-mode optical fiber (SMF) defined by the ITU-T G652 having anomalous dispersion (positive wavelength dispersion) at the wavelength of 1550 nanometers constituting the optical fiber amplifier or the optical amplification device together with the EDF 5 is able to be compensated. As a result, residual dispersion of light finally output from the optical device is reducible and waveform degradation of input light is suppressible.

When an optical pulse is amplified with the EDF 5, occurrence of higher-order soliton, which is a nonlinear optical phenomenon and becomes a cause of disturbing a pulse waveform, is suppressible, because the EDF 5 has normal dispersion characteristics.

Recently, there have been technical developments of applying optical-fiber type ultrashort pulse lasers having many advantageous characteristics such as high intensity, being maintenance-free, and lightness in weight and portability, in various fields such as metrology, material processing, biotechnology, and medical technology, and the EDF 5 may be suitably used particularly in such an ultrashort pulse laser.

Because the EDF 5 is doped with Al to an appropriate concentration, concentration quenching is suppressed to an extent of having no problem for practical uses, even though the EDF 5 is dope with Er to a high concentration. As a result, a high power-conversion efficiency of 30% or higher is obtainable as described later.

The concentration quenching is a phenomenon where energy of pumping light absorbed by Er is quenched by a radiationless process that occurs among Er when the concentration of Er becomes high.

Because the EDF 5 has a step-index type refractive index profile as described above, connectivity with the SMF is facilitated, and a connection loss becomes equal to or lower than 0.2 dB, which is greatly lower than that of the W-type EDF.

The core diameter of the EDF 5, the relative refractive-index difference Δ, and the Er concentration are not limited to the above-described values. For example, by appropriately selecting a core diameter, a relative refractive-index difference Δ, and an Er concentration from a range of 2 to 4 micrometers for the core diameter, a range of 0.8 to 1.3% for the relative refractive-index difference Δ and 1.5 mass % or lower for the Er concentration and combining them, it is possible to realize an EDF having normal dispersibility, a peak value of an absorption coefficient equal to or larger than 35 dB/m, an effective core area equal to or larger than 20 µm², and a power conversion efficiency equal to or higher than 30%.

The Al concentration is appropriately set according to the concentration of Er and the like to suppress concentration quenching, and, for example, preferably about 1 to 5 mass %.

An optical fiber for optical amplification according to a modification of the first embodiment is explained next. The optical fiber for optical amplification according to the modification has a configuration in which the optical fiber for optical amplification EDF 5 according to the first embodiment is replaced by a polarization-maintaining optical fiber.

Figure 2:
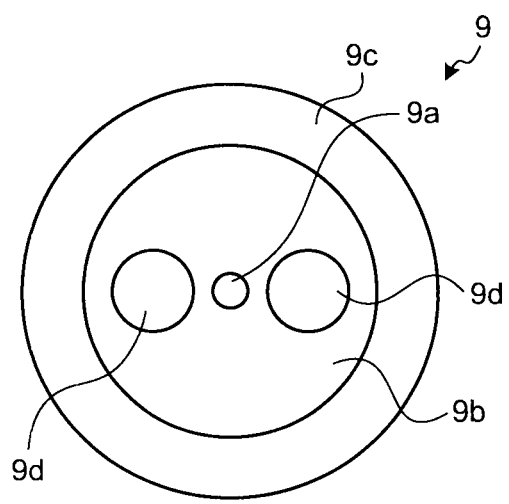
FIG. 2 is a schematic cross-sectional view of a polarization-maintaining EDF, which is an optical fiber for optical amplification according to a modification of the first embodiment.

FIG. 2 is a schematic cross-sectional view of a polarization-maintaining EDF, which is the optical fiber for optical amplification according to the modification. As depicted in FIG. 2, a polarization-maintaining EDF 9 includes: a core portion 9a; a cladding portion 9b formed around the core portion 9a; and a coating 9c made of a resin and formed around the cladding portion 9a, and further, stress-applying members 9d and 9d are provided at both sides of the core portion 9a of the cladding portion 9b to sandwich the core portion 9a, thereby forming a polarization-maintaining structure. The core portion 9a, the cladding portion 9b, and the coating 9c are similar to those of the EDF 5 depicted in FIG. 1, and the core portion 9a and the cladding portion 9b have a refractive index profile similar to that of the EDF 5. The stress-applying members 9d and 9d are made of quartz glass doped with boron (B).

Examples of preferable characteristics of the stress-applying members 9d and 9d are: a diameter of 30 to 35 micrometers; a distance of approximately 5 micrometers from the core portion 9a; and a relative refractive-index difference with respect to the cladding portion 9b of −0.5 to −0.7%.

In the polarization-maintaining EDF 9, a core diameter of the core portion 9a, a relative refractive-index difference Δ with respect to the cladding portion 9b of the core portion 9a, an Er concentration of the core portion 9a, and an Ar concentration are also set similar to those of the EDF 5. Therefore, the polarization-maintaining EDF 9 has normal dispersibility and characteristics including a peak value of an absorption coefficient being equal to or larger than 35 dB/m, an effective core area being equal to or larger than 20 µm², and a power conversion efficiency being equal to or higher than 30%. A birefringence index of the polarization-maintaining EDF 9 is, for example, $5.4 \times 10^{-4}$.

The optical fiber for optical amplification according to the modification is also able to obtain effects similar to those of the optical fiber for optical amplification according to the first embodiment, and occurrence of nonlinear optical phenomena is further suppressible. In addition, because the optical fiber for optical amplification according to the modification is of the polarization-maintaining type, output light is maintained in the same polarization state as that of input light.

Figure 3:
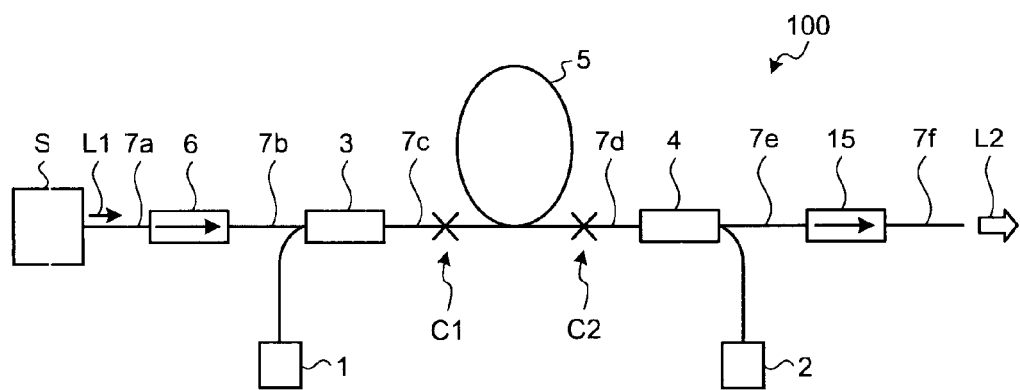
FIG. 3 is a schematic diagram of a configuration of an optical fiber amplifier according to a second embodiment of the present invention.

An optical fiber amplifier according to a second embodiment of the present invention is explained next. FIG. 3 is a schematic diagram of a configuration of the optical fiber amplifier according to the second embodiment. As depicted in FIG. 3, an optical fiber amplifier 100 includes pumping light sources 1 and 2, optical couplers 3 and 4, the EDF 5 in the first embodiment as an optical fiber for optical amplification, optical isolators 6 and 15, and connection optical fibers 7a to 7f directly or indirectly connected to the EDF 5, and has a bidirectional pumping configuration. The optical fiber amplifier 100 also includes optical fibers connecting the pumping light sources 1 and 2 with the optical couplers 3 and 4, respectively. The optical fiber amplifier 100 is connected to a pulse light source S that outputs pulse light L1 having a wavelength of 1550 nanometers selected from a range of 1545 to 1565 nanometers, and receives by the connection optical fiber 7a the pulse light L1 to be amplified. The EDF 5 optically amplifies the received pulse light L1, and outputs amplified pulse light L2 from the connection optical fiber 7f. The pulse light source S is configured with an optical-fiber laser or a semiconductor laser, for example. The pulse light L1 output has a pulse width equal to or smaller than 800 fs, for example, and has a repetition frequency of 30 to 50 MHz. The energy of the pulse light L1 per pulse is set such that the EDF 5 operates in a gain saturation state, and is, for example, 3 to 4 pJ.

Elements of the second embodiment are explained next. The pumping light sources 1 and 2 output pumping light having a wavelength of a 980-nm band or a 1480-nm band, and are configured with, for example, semiconductor lasers. The light intensity of pumping light output from the pumping light sources 1 and 2 is, for example, 300 to 700 mW. The optical coupler 3 is connected to the pumping light source 1 and the connection optical fibers 7b and 7c, and is configured to receive pumping light output by the pumping light source 1 to output the received pumping light to the connection optical fiber 7b, and to receive the pulse light L1 guided by the connection optical fiber 7b to output the received pulse light L1 to the connection optical fiber 7c. The optical coupler 3 is configured with a wavelength division multiplexing (WDM) coupler of, for example, fiber-fusion-type or of filter-type.

The EDF 5 is fusion-connected to the connection optical fibers 7c and 7d at connection points C1 and C2, respectively.

When the EDF 5 receives the pulse light L1 guided by the connection optical fiber 7c while Er is in an optically pumped state upon the EDF 5 absorbing pumping light supplied from the pumping light sources 1 and 2 via the optical couplers 3 and 4 and the connection optical fibers 7c and 7d, the EDF 5 optically amplifies the pulse light L1 by stimulated emission of Er and outputs the amplified pulse light L2 to the connection optical fiber 7d.

The optical coupler 4 is connected to the pumping light source 2 and the connection optical fibers 7d and 7e, and is configured to receive pumping light output by the pumping light source 2, let connection optical fiber 7d guide the received pumping light, receive the amplified pulse light L2 guided by the connection optical fiber 7d, and output the received amplified pulse light L2 to the connection optical fiber 7e. The optical coupler 4 is also configured with, for example, a WDM coupler.

The optical isolator 6 is connected to the connection optical fibers 7a and 7b. The optical isolator 6 is polarization-independent, and has a function of receiving the pulse light L1 guided by the connection optical fiber 7a, outputting the pulse light L1 to the connection optical fiber 7b, blocking the light guided by the connection optical fiber 7b, and not outputting the light toward the connection optical fiber 7a. The optical isolator 15 is connected to the connection optical fibers 7e and 7f. The optical isolator 15 is polarization-independent, and has a function of receiving the amplified pulse light L2 guided by the connection optical fiber 7e, outputting the amplified pulse light L2 to the connection optical fiber 7f, blocking the light guided by the connection optical fiber 7f, and not outputting the light toward the connection optical fiber 7f. The connection optical fiber 7f outputs the amplified pulse light L2 guided to outside. For example, the energy of the amplified pulse light L2 per pulse is 8 nJ.

The connection optical fibers 7a to 7f have anomalous dispersion characteristics at wavelengths of 1545 to 1565 nanometers, and are, for example, SMFs. In the second embodiment, the connection optical fibers 7a to 7f are of the same type, and their wavelength dispersion values are substantially the same.

As described above, the optical fiber amplifier 100 amplifies the pulse light L1 of a wavelength of 1550 nanometers, and outputs the amplified pulse light L2.

As described above, the EDF 5 has the power conversion efficiency of 30% or more for the conversion from the pumping light to the amplified light at the wavelength of 1550 nanometers, and is a practical EDF in terms of energy efficiency.

The power conversion efficiency of the EDF 5 is defined by the following equation (2).

$$(\text{Power Conversion Efficiency}) = (Ps^{out} - Ps^{in})/Pp^{in} \times 100 \, [\%] \quad (2)$$

In the above equation, $Ps^{in}$ represents a light intensity of continuum to be amplified that is input to the EDF 5, $Ps^{out}$ represents a light intensity of the amplified continuum output from the EDF, and $Pp^{in}$ represents a sum of light intensities of pumping light input from both sides of the EDF 5. Because each of the light intensities is a value at a facet of the EDF 5, the influence of connection loss at the connection points C1 and C2 is not included in the value of the power conversion efficiency. Each of the light intensities is a value expressed in linear units of "mW" or the like.

Because the EDF 5 has the step-index type refractive index profile as described above, the connectivity with the connection optical fibers 7c and 7d, which are SMFs or the like, is good. As a result, loss in the pulse light L1, the amplified pulse light L2, and the pumping light at the connection points C1 and C2 is very low at 0.2 dB or lower.

In the optical fiber amplifier 100a, at a wavelength of 1550 nanometers, sum of a product of a wavelength dispersion value and a length of the EDF 5 and a product of a wavelength dispersion value and a length of the connection optical fibers 7a to 7f preferably becomes zero. That is, the following equation (3) is preferably satisfied, where $D_{EDF}$ and $L_{EDF}$ represent a wavelength dispersion value and a length of the EDF 5 respectively, and $D_{CF}$ and $L_{CF}$ represent a wavelength dispersion value of each of the connection optical fibers 7a to 7f and a sum of lengths of the connection optical fibers 7a to 7f, respectively.

$$D_{EDF}L_{EDF} + D_{CF}L_{CF} = 0 \quad (3)$$

As explained above, in the optical fiber amplifier 100, when a sum of a product of the wavelength dispersion value and the length of the EDF 5 and a product of the wavelength dispersion value and the length of the connection optical fibers 7a to 7f, which are optical fibers guiding the input pulse light L1 to be amplified or the amplified pulse light L2, is zero, residual dispersion within the optical fiber amplifier 100 becomes zero. Therefore, this is preferable because the influence of residual dispersion does not remain in the amplified pulse light L2 finally output from the optical fiber amplifier 100, and the amplified pulse light L2 is maintained in a form closer to that of the input pulse light L1.

Figure 4:
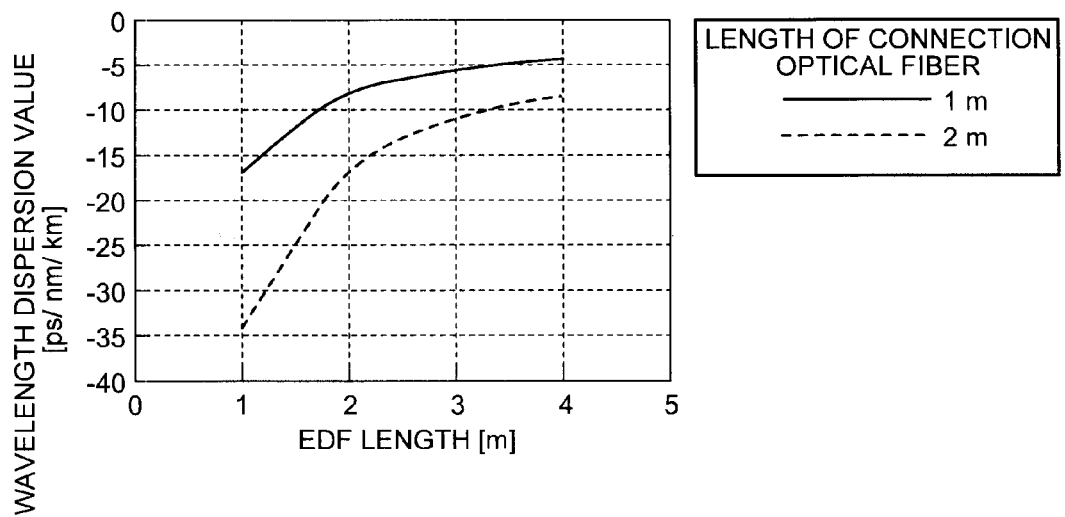
FIG. 4 depicts a relationship between lengths and wavelength dispersion values of an EDF when a total sum of lengths of connection optical fibers is 1 meter or 2 meters.

FIG. 4 depicts a relationship between length and wavelength dispersion value of the EDF 5 satisfying the equation (3), when a total sum of lengths of the connection optical fibers 7a to 7f is 1 meter or 2 meters. In FIG. 4, a wavelength dispersion value of the EDF 5 is of a value at a wavelength of 1550 nanometers. The connection optical fibers 7a to 7f are SMFs and each wavelength dispersion value at the wavelength of 1550 nanometers is +15 to +17 ps/nm/km.

As depicted in FIG. 4, when SMFs are used as the connection optical fibers 7a to 7f and a total sum of their lengths is about 1 meter to 2 meters, the equation (3) is satisfied by making the length of the EDF 5 one meter to four meters, as long as the wavelength dispersion value of the EDF 5 is −5 to −30 ps/nm/km.

In the equation (3), the right side is zero, but it may not be completely zero, and as long as it is approximately zero at 0.1 ps/nm or smaller, this is preferable as residual dispersion within the optical fiber amplifier 100 becomes very small.

As explained above, according to the optical fiber amplifier 100 of the second embodiment, occurrence of nonlinear optical phenomena are further suppressed. Particularly, by suppressing occurrence of high-order soliton, the amplified pulse light L2 is able to have a more preferable pulse form.

An optical fiber amplifier according to a modification of the second embodiment is explained next. The optical fiber amplifier according to the modification has a configuration in which the EDF 5 and the connection optical fibers 7a to 7f are replaced by polarization-maintaining optical fibers in the optical fiber amplifier 100 according to the second embodiment.

The polarization-maintaining connection optical fibers to replace the connection optical fibers 7a to 7f have stress-applying members similarly to the polarization-maintaining EDF 9 depicted in FIG. 2 in cladding portions of optical fibers similar to the connection optical fibers 7a to 7f. The polarization-maintaining connection optical fibers have anomalous dispersion characteristics at wavelengths of 1545 to 1565 nanometers, and are, for example, optical fibers that have a zero dispersion wavelength around 1310 nanometers and that are defined by the ITU-T G652, similarly to SMFs. The polarization-maintaining connection optical fibers and the polarization-maintaining EDF 9 are directly or indirectly connected to each other such that their polarization axes match each other.

The optical isolators 6 and 15 may be replaced with polarization-dependent optical isolators.

In the optical fiber amplifier according to the modification, occurrence of nonlinear optical phenomena is further suppressed similarly to the optical fiber amplifier 100 according to the second embodiment. Particularly, the pulse form of the amplified pulse light becomes preferable without any disorder. Further, in the optical fiber amplifier according to the modification, all of the polarization-maintaining EDF 9 and the polarization-maintaining connection optical fibers, which are all optical fibers guiding the input pulse light to be amplified or the amplified pulse light, are of the polarization-maintaining type. Therefore, the amplified pulse light is maintained in the same polarization state as that of the input pulse light. Particularly, when the pulse light to be amplified is in a linear polarization state and the pulse light is input such that a polarization direction of the pulse light matches the polarization axis of each polarization-maintaining optical fiber of the optical fiber amplifier, the amplified pulse light is also output in the linear polarization state, and thus this is preferable as the pulse light in a stable polarization state is obtained.

The present invention is explained in further detail with reference to Examples and Comparative Examples. The present invention is not limited thereto. EDFs were manufactured as Examples and Comparative Examples. A polarization-maintaining EDF of a configuration as depicted in FIG. 2 was manufactured as Example 4, and the EDFs of a configuration as depicted in FIG. 1 were manufactured as Examples 1 to 3 and Comparative Examples 1 and 2. FIG. 5 depicts characteristics of the EDFs according to the Examples and Comparative Examples. In FIG. 5, "Aeff" represents an effective core area. The item, "absorption coefficient", represents a peak value of an absorption coefficient at a wavelength of around 1530 nanometers. The item, "conversion efficiency", represents results of measurement by manufacturing optical fiber amplifiers of the configuration of the second embodiment or its modification using the EDFs of the Examples and Comparative Examples, where a wavelength of pumping light was around 1480 nanometers, a wavelength of signal light to be amplified was 1550 nanometers, and an average light intensity at an EDF facet was 0.5 mW. FIG. 5 also depicts a birefringence index of a polarization-maintaining optical fiber of Example 4.

As depicted in FIG. 5, the Er concentration in the EDF of Comparative Example 1 is too high, and therefore the EDF of Comparative Example 1 had a small conversion efficiency of 8% and was not a practical EDF. The EDF of Comparative Example 2 had an absorption coefficient of 19.8 dB/m, and thus was not suitable for use with a short length.

On the contrary, the absorption coefficients of the EDFs of Examples 1 to 4 were 35 dB/m or larger, and were of particularly preferable values of 50 dB/m or larger. Further, the effective core area Aeff was 20 $\mu m^2$ or larger, and the power conversion efficiency was 30% or more, which were preferable. The EDFs of Examples 1 to 4 also had normal dispersion characteristics, and wavelength dispersion values of a range of −5 to −30 ps/nm/km. The cutoff wavelengths were smaller than 1480 nanometers, and both pumping light and pulse light were propagated in a single mode fashion.

Figure 6:
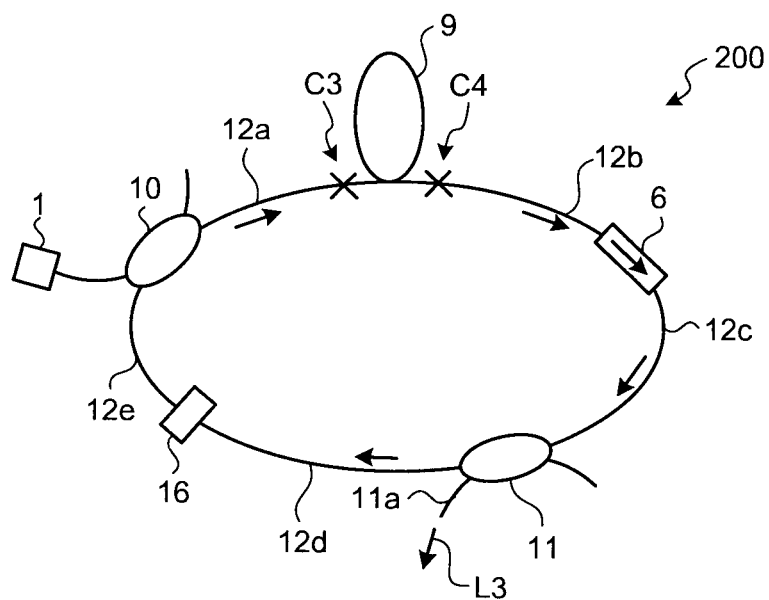
FIG. 6 is a schematic diagram of a configuration of an optical-fiber laser according to a third embodiment of the present invention.

A third embodiment of the present invention is explained next. FIG. 6 is a schematic diagram of a configuration of an optical-fiber laser 200 according to the third embodiment. As depicted in FIG. 6, the optical-fiber laser 200 includes the pumping light source 1, optical couplers 10 and 11, the polarization-maintaining EDF 9, the optical isolator 6, a saturable absorber 16, and polarization-maintaining connection optical fibers 12a to 12e directly or indirectly connected to the polarization-maintaining EDF 9. The optical-fiber laser 200 further includes an optical fiber connecting the pumping light source 1 and the optical coupler 10.

The optical coupler 10, the polarization-maintaining connection optical fiber 12a, the polarization-maintaining EDF 9, the polarization-maintaining connection optical fiber 12b, the optical isolator 6, the polarization-maintaining connection optical fiber 12c, the optical coupler 11, the polarization-maintaining connection optical fiber 12d, the saturable absorber 16, and the polarization-maintaining connection optical fiber 12e are connected in this order, thereby forming a ring resonator. The polarization-maintaining EDF 9 is connected to the polarization-maintaining connection optical fibers 12a and 12b at connection points C3 and C4 respectively with low connection loss.

The optical-fiber laser 200 is configured such that when pumping light is output from the pumping light source 1 and supplied to the polarization-maintaining EDF 9, pulse light of a wavelength of 1550 nanometers is laser-emitted by: optical amplification by the polarization-maintaining EDF 9; the operation of the ring resonator as an optical resonator; the operation of the saturable absorber 16 as an optical switch; and nonlinear polarization rotation, and amplified pulse light L3, which is part of the laser-oscillated pulse light, is output from an output port 11a of the optical coupler 11.

Elements of the third embodiment are explained next. The optical coupler 10 is configured to receive pumping light output from the pumping light source 1 to output the received pumping light to the polarization-maintaining connection optical fiber 12a, and to receive pulse light guided by the polarization-maintaining connection optical fiber 12e to output the received pulse light to the polarization-maintaining connection optical fiber 12a.

The optical coupler 11 is configured to receive pulse light guided by the polarization-maintaining connection optical fiber 12c, output a component of about 90 to 99% of a light intensity of the received pulse light to the polarization-maintaining connection optical fiber 12d, and output a component of the remaining percentage of about 1 to 10% from the output port 11a.

The saturable absorber 16 functions as an absorber when light of a low intensity is input, and functions as a transparent body as an absorption coefficient is saturated when light of a high intensity is input. The saturable absorber 16 may be a semiconductor element or a carbon nanotube, having an active layer of a multiple quantum well structure, for example.

The polarization-maintaining connection optical fibers 12a to 12e are similar to the polarization-maintaining connection optical fibers used in the modification of the second embodiment. The optical isolator 6 is of a polarization dependent type. The pumping light source 1 and the polarization-maintaining EDF 9 are similar to those depicted in FIG. 2 or 3.

A connection relationship between the polarization-maintaining EDF 9 and the polarization-maintaining connection optical fibers 12a to 12e, which both constitute the ring resonator, is such that one part is in a connection state with a polarization axis of each polarization-maintaining optical fiber being inclined by 45 degrees and the other part is directly or indirectly connected so that their polarization axes match each other.

The optical-fiber laser 200 achieves passive-mode-locking pulse laser emission due to occurrence of an optical switching operation caused by nonlinear polarization-rotation phenomenon because the optical-fiber laser 200 includes the optical isolator 6 of the polarization dependent type in the ring resonator and has the one part with the polarization axis inclined by 45 degrees, and due to an optical switching operation of the saturable absorber 16.

In this optical fiber laser 200 also, by using the polarization-maintaining EDF 9 having normal dispersibility, a peak value of absorption coefficient of equal to or larger than 35 dB/m, an effective core area equal to or larger than 20% $\mu m^2$, and a power conversion efficiency equal to or higher than 30%, occurrence of nonlinear optical phenomena are further suppressed, and particularly, a pulse form of the amplified pulse light L3 becomes preferable without any disorder.

Furthermore, in this optical fiber laser 200 also, when a sum of a product of a wavelength dispersion value and a length of the polarization-maintaining EDF 9 and a product of a wavelength dispersion value and a length of the polarization-maintaining connection optical fibers 12a to 12e is zero or approximately zero at the wavelength of the amplified pulse light L3, this is preferable as a form of the amplified pulse light L3 becomes better.

Figure 7:
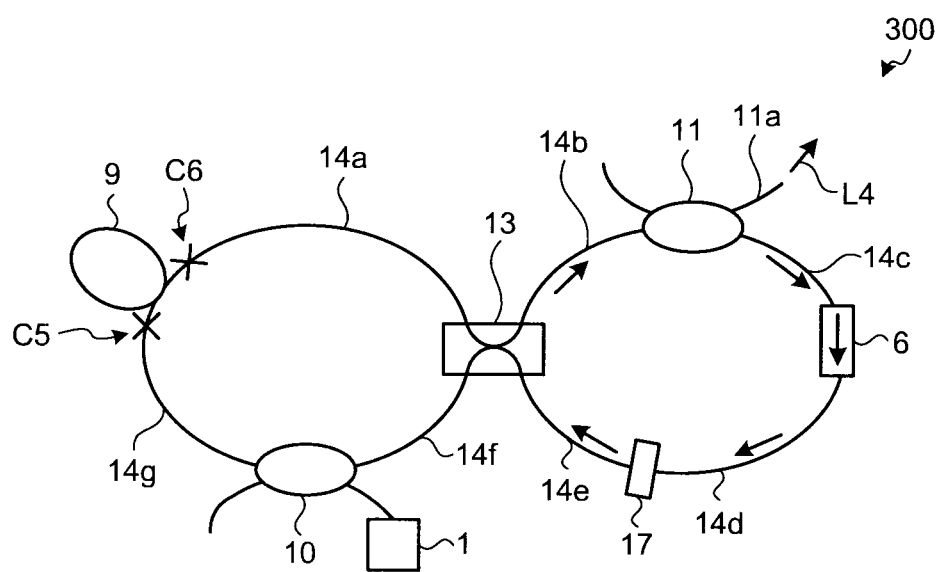
FIG. 7 is a schematic diagram of a configuration of an optical-fiber laser according to a fourth embodiment of the present invention.

A fourth embodiment of the present invention is explained next. FIG. 7 is a schematic diagram of a configuration of an optical-fiber laser 300 according to the fourth embodiment. As depicted in FIG. 7, the optical-fiber laser 300 includes the pumping light source 1, the optical couplers 10 and 11, an optical coupler 13 having a branch ratio of 3:7 or 4:6, the polarization-maintaining EDF 9, the optical isolator 6, an optical modulator 17, and polarization-maintaining connection optical fibers 14a to 14g directly or indirectly connected to the polarization-maintaining EDF 9. The optical-fiber laser 300 further includes an optical fiber connecting the pumping light source 1 and the optical coupler 10.

The polarization-maintaining connection optical fiber 14a, the polarization-maintaining EDF 9, the polarization-maintaining connection optical fiber 14g, the optical coupler 10, and the polarization-maintaining connection optical fiber 14f are connected to the optical coupler 13 in this order in a ring shape, thereby forming a nonlinear-amplifying loop mirror (NALM). Moreover, the polarization-maintaining connection optical fiber 14b, the optical coupler 11, the polarization-maintaining connection optical fiber 14c, the optical isolator 6, the polarization-maintaining connection optical fiber 14d, the optical modulator 17, and the polarization-maintaining connection optical fiber 14e are connected to the optical coupler 13 in this order in a ring shape, thereby forming an 8-shaped resonator together with the NALM. The polarization-maintaining EDF 9 is connected to the polarization-maintaining connection optical fibers 14a and 14g at connection points C6 and C5 with low loss.

The optical-fiber laser 300 is configured such that pulse light at a wavelength of 1550 nanometers is laser-emitted and amplified pulse light L4, which is a part of the laser-emitted pulse light, is output from the output port 11a of the optical coupler 11, when pumping light from the pumping light source 1 is output and supplied to the polarization-maintaining EDF 9, due to an optical amplification operation of the polarization-maintaining EDF 9, an operation of the 8-shaped resonator as an optical resonator, passive mode locking by an optical switching operation of the NALM, and active mode locking by the optical modulator 17.

The optical couplers 10 and 11 are similar to those depicted in FIG. 6. The polarization-maintaining connection optical fibers 14a to 14g are similar to the polarization-maintaining connection optical fibers 12a to 12e depicted in FIG. 6. Further, the polarization-maintaining connection optical fibers 14a to 14g are directly or indirectly connected to the polarization-maintaining EDF 9 so that their polarization axes match each other. The optical isolator 6 is of the polarization dependent type. The pumping light source 1 and the polarization-maintaining EDF 9 are similar to those depicted in FIG. 2 or 3. The optical modulator 17 uses lithium niobate (LN).

The optical-fiber laser 300 also uses the polarization-maintaining EDF 9 having normal dispersibility, a peak value of an absorption coefficient of equal to or larger than 35 dB/m, an effective core area equal to or larger than 20% $\mu m^2$, and a power conversion efficiency equal to or higher than 30%. As a result, occurrence of nonlinear optical phenomena is further suppressed, and particularly, a pulse form of the amplified pulse light L4 becomes preferable without any disorder.

Furthermore, in the optical-fiber laser 300, when a sum of a product of a wavelength dispersion value and a length of the polarization-maintaining EDF 9 and a product of a wavelength dispersion value and a length of the polarization-maintaining connection optical fibers 14a to 14g is zero or approximately zero at the wavelength of the amplified pulse light L4, this is preferable as a form of the amplified pulse light L4 becomes better.

Although the optical fiber amplifiers according to the second embodiment and its modification have bidirectional pumping configurations, the present invention is not limited thereto, and the optical fiber amplifiers may have a forward pumping configuration or a counter pumping configuration. Although the optical-fiber lasers according to the third and fourth embodiments have a ring-shaped or 8-shaped optical resonator structure, the optical-fiber lasers may have a linear optical resonator structure.

According to the present invention, an optical fiber for optical amplification where occurrence of nonlinear optical phenomena are further suppressed, and an optical fiber amplifier and an optical-fiber laser using the optical fiber for optical amplification are realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber amplifier, comprising:
    an optical fiber for optical amplification, including:
        a core portion doped with at least erbium and aluminum,
        a cladding portion formed around the core portion and having a refractive index smaller than that of the core portion,
        a peak value of absorption coefficient of 35 dB/m or greater at a wavelength around 1530 nanometers,
        normal dispersion characteristics and an effective core area of 20 square micrometers or larger, at a wavelength of 1550 nanometers, and
        a power conversion efficiency of a conversion from pumping light to amplified light having a wavelength of 1550 nanometers being 30% or more;
    a pumping light source configured to output the pumping light for pumping the optical fiber for optical amplification; and
    at least one connection optical fiber connected to the optical fiber for optical amplification and configured to guide light being amplified or the amplified light, wherein
    at the wavelength of 1,550 nanometers, a sum of a product of a wavelength dispersion value and a length of the optical fiber for optical amplification and a product of a wavelength dispersion value and a length of the at least one connection optical fiber is approximately zero.

2. The optical fiber amplifier according to claim 1, wherein
    a diameter of the core portion is 2 to 4 micrometers,
    a relative refractive-index difference of the cladding portion with respect to the core portion is 0.8 to 1.3%, and
    in the core portion, a concentration of erbium is 1.5 wt % or less and a concentration of aluminum is 1 to 5 wt %.

3. The optical fiber amplifier according to claim 1, wherein a wavelength dispersion value at the wavelength of 1550 nanometers is −5 to −30 ps/nm/km.

4. The optical fiber amplifier according to claim 1, wherein stress-applying members are provided in the cladding portion on both sides of the core portion to sandwich the core portion.

5. An optical fiber laser, comprising:
    an optical fiber for optical amplification, including:
        a core portion doped with at least erbium and aluminum,
        a cladding portion formed around the core portion and having a refractive index smaller than that of the core portion,
        a peak value of absorption coefficient of 35 dB/m or greater at a wavelength around 1530 nanometers,
        normal dispersion characteristics and an effective core area of 20 square micrometers or larger, at a wavelength of 1550 nanometers, and
        a power conversion efficiency of a conversion from pumping light to amplified light having a wavelength of 1550 nanometers being 30% or more;
    a pumping light source configured to output the pumping light for pumping the optical fiber for optical amplification; and
    at least one connection optical fiber connected to the optical fiber for optical amplification and configured to guide light being amplified or the amplified light, wherein
    at the wavelength of 1,550 nanometers, a sum of a product of a wavelength dispersion value and a length of the optical fiber for optical amplification and a product of a wavelength dispersion value and a length of the at least one connection optical fiber is approximately zero.

6. The optical fiber laser according to claim 5, wherein
    a diameter of the core portion is 2 to 4 micrometers,
    a relative refractive-index difference of the cladding portion with respect to the core portion is 0.8 to 1.3%, and
    in the core portion, a concentration of erbium is 1.5 wt % or less and a concentration of aluminum is 1 to 5 wt %.

7. The optical fiber laser according to claim 5, wherein a wavelength dispersion value at the wavelength of 1550 nanometers is −5 to −30 ps/nm/km.

8. The optical fiber laser according to claim 5, wherein stress-applying members are provided in the cladding portion on both sides of the core portion to sandwich the core portion.

* * * * *